Mar. 6, 1923.
O. V. BROWN ET AL.
LOG LOADING DEVICE.
FILED FEB. 20, 1922.
1,447,201.
4 SHEETS—SHEET 2.
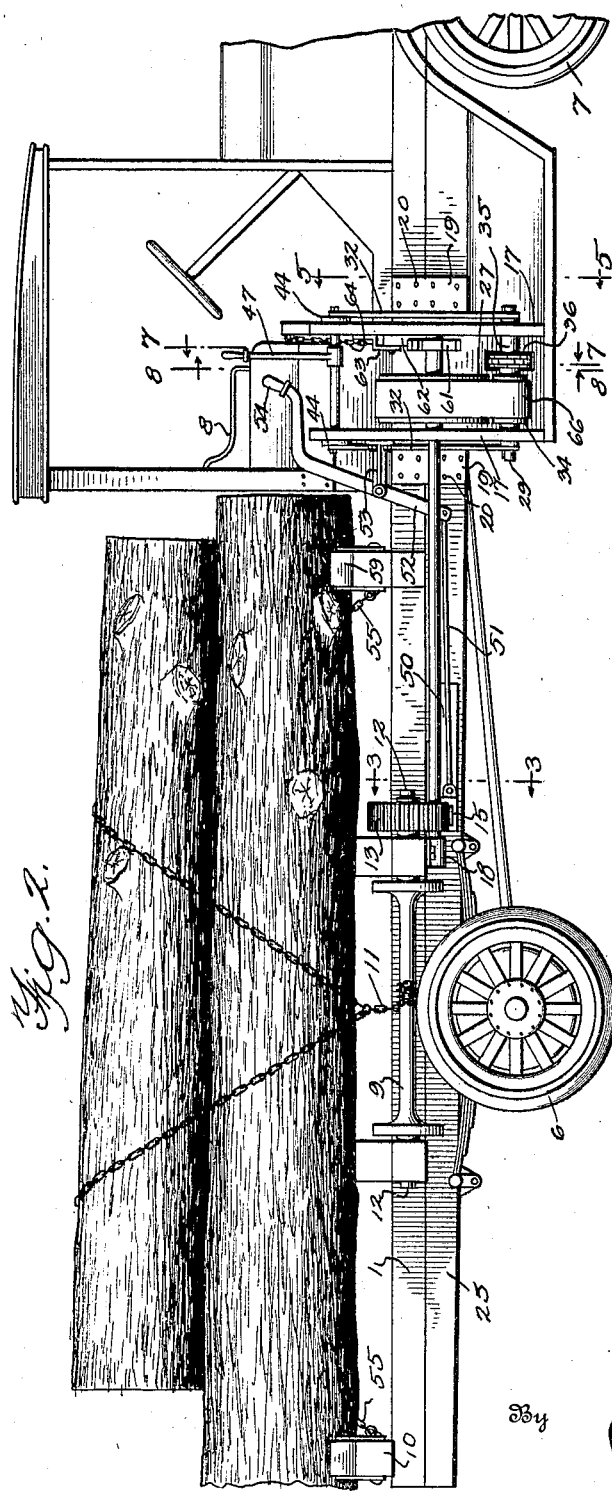
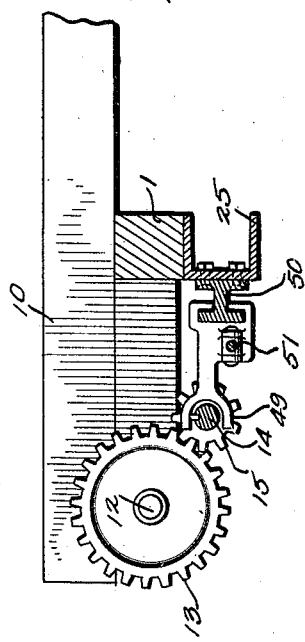
Inventors
O. V. Brown
F. T. Brown
A. J. Brown
By
Attorney Mar. 6, 1923.
O. V. BROWN ET AL.
LOG LOADING DEVICE.
FILED FEB. 20, 1922.
1,447,201.
4 SHEETS—SHEET 3.
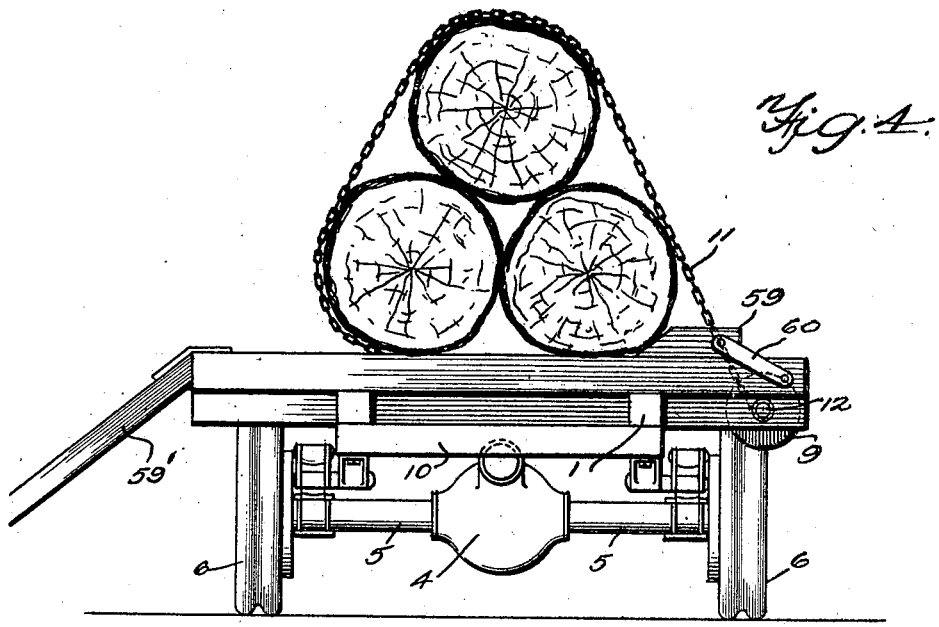
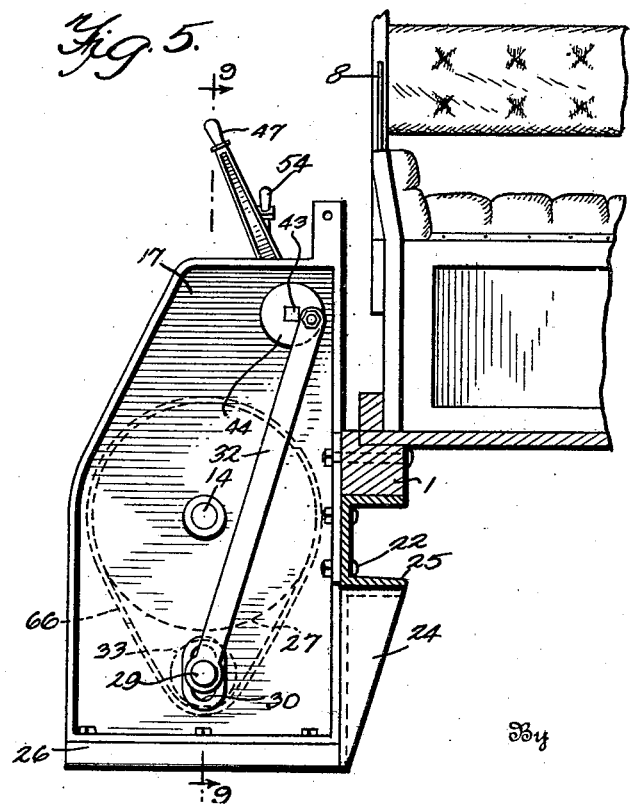
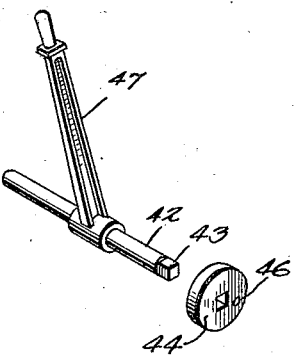
Inventors
O. V. Brown
F. T. Brown
A. J. Brown
By
Ch. Parker
Attorney

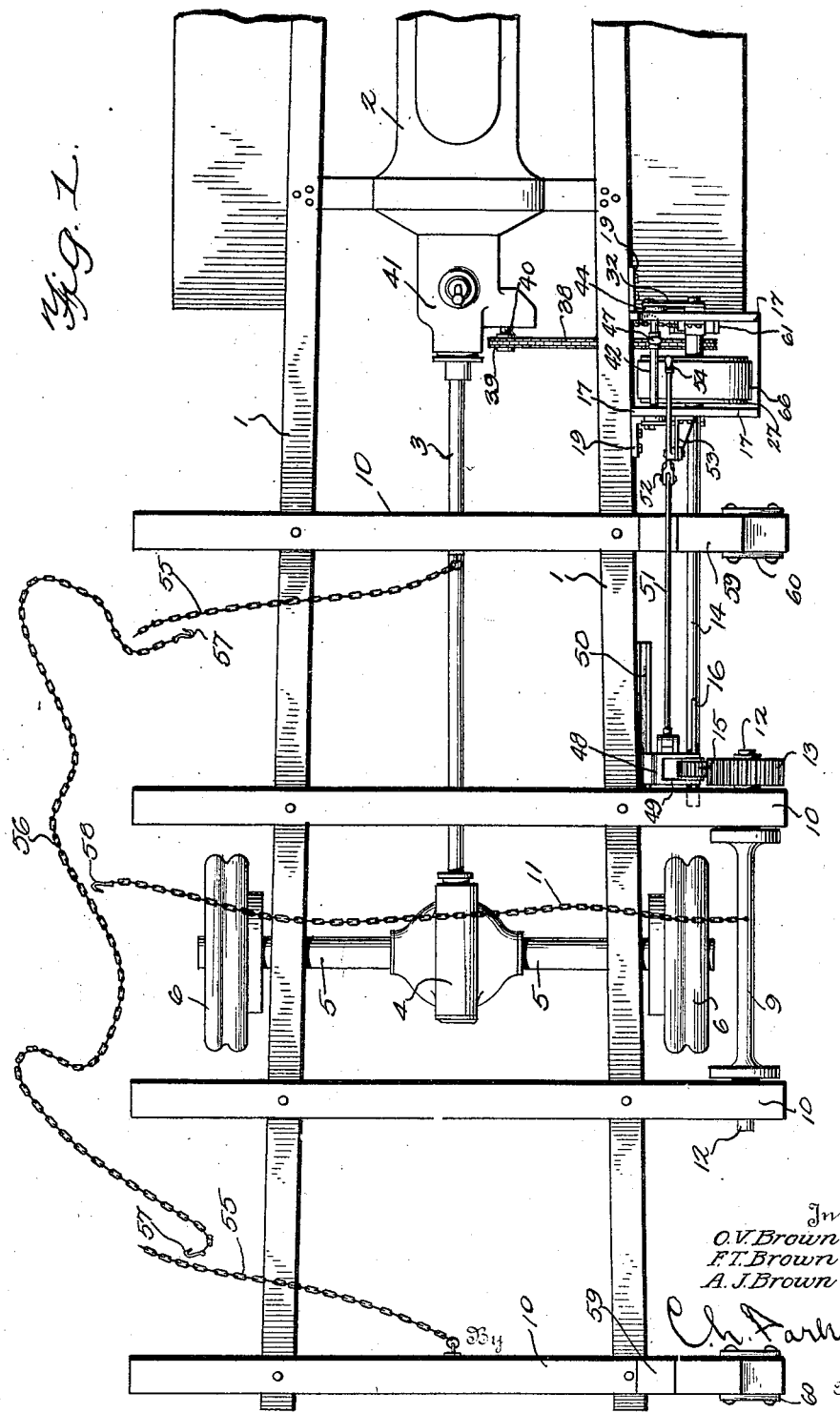

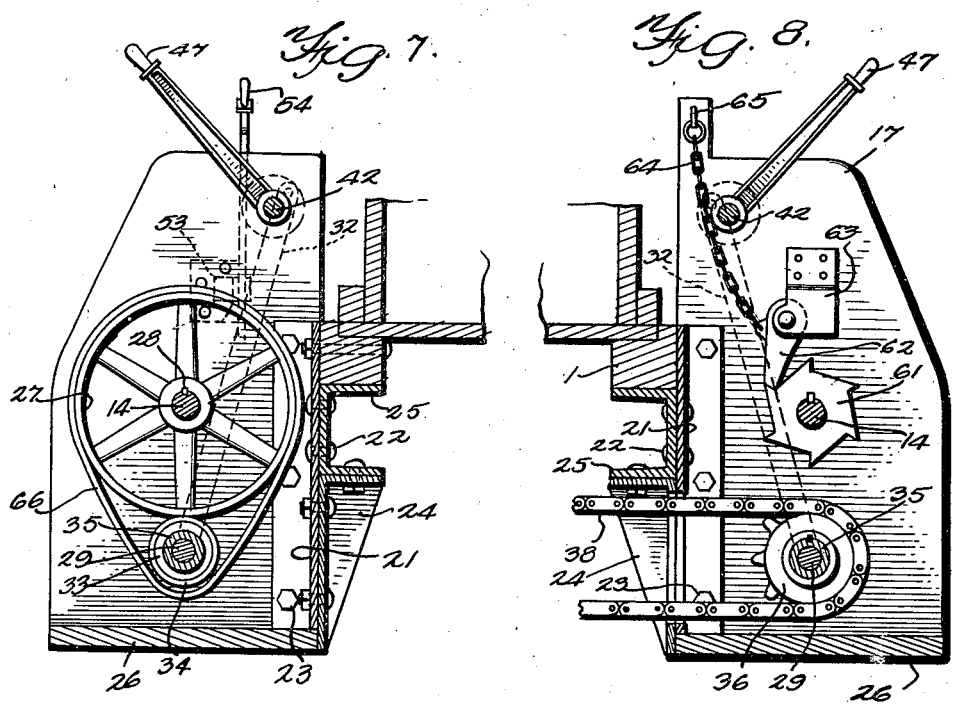
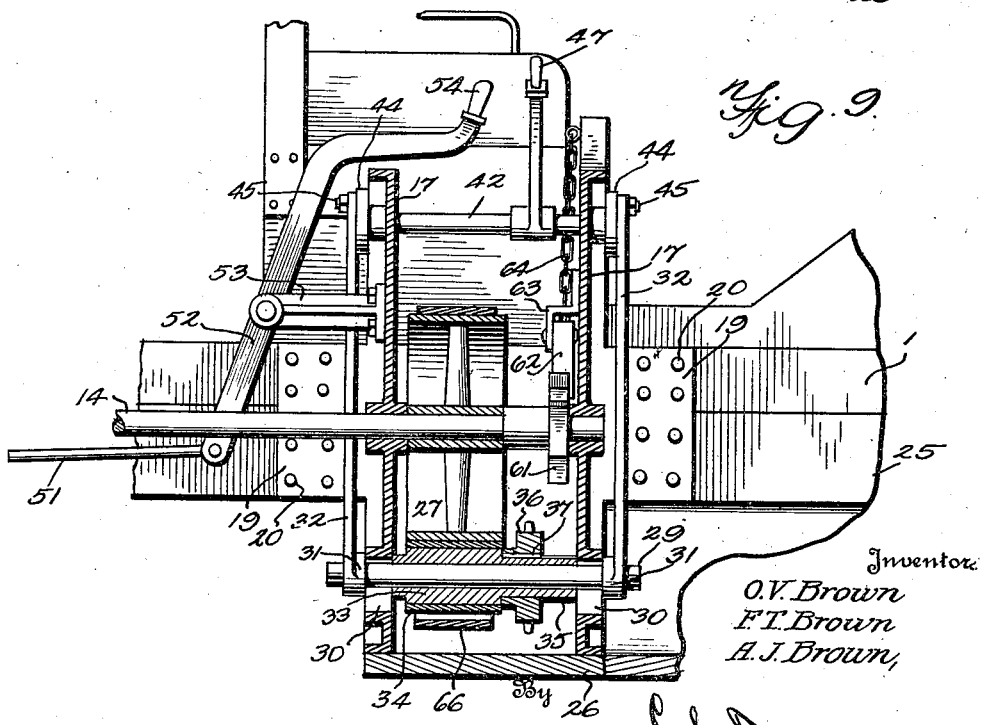

Patented Mar. 6, 1923.

1,447,201

UNITED STATES PATENT OFFICE.

ORIAN V. BROWN, FRANK T. BROWN, AND ALBERT J. BROWN, OF DALE, INDIANA.

LOG-LOADING DEVICE.

Application filed February 20, 1922. Serial No. 538,073.

*To all whom it may concern:*

Be it known that we, ORIAN V. BROWN, FRANK T. BROWN, and ALBERT J. BROWN, citizens of the United States, residing at Dale, in the county of Spencer and State of Indiana, have invented certain new and useful Improvements in Log-Loading Devices, of which the following is a specification.

This invention relates to log loading devices for motor vehicles, and more particularly to loading means adapted to be driven by the engine of the vehicle.

An object of the invention is the provision of log loading means connected to the engine and controlled from the operator's seat of the vehicle.

A further object of the invention is the provision of reversing means, whereby the loading mechanism may be operated in a reverse direction for releasing the chains or other flexible elements by means of which the logs are held on the vehicle.

A further object is the provision of a neat, compact apparatus which may be mounted on a motor vehicle at one side of the driver's seat and not occupy any of the space in the body of the vehicle employed for the reception of the load to be hauled.

A further object is the provision of reverse gearing consisting of a pulley and sleeve arranged on two shafts to be connected, having a belt passing around the pulley and sleeve to drive the machine in one direction, and having means for moving the sleeve into engagement with the periphery of the pulley to drive, by friction, in a reverse direction.

In the accompanying drawings, we have shown one embodiment of the invention. In this showing:

Figure 1 is a plan view of a portion of a motor vehicle showing the invention applied, Figure 2 is a side elevation, Figure 3 is a detail view of a portion of the loading mechanism, on line 3—3 of Figure 2, Figure 4 is a rear elevation.

Figure 5 is a vertical sectional view on line 5—5 of Figure 2,

Figure 6 is a detail view of a portion of the control mechanism,

Figure 7 is a vertical sectional view on line 7—7 of Figure 2,

Figure 8 is a similar view on line 8—8 of Figure 2, and,

Figure 9 is a vertical longitudinal sectional view on line 9—9 of Figure 5.

Referring to the drawings, the reference numeral 1 designates the body of a motor vehicle which is provided with an engine 2, a drive shaft 3, and the usual differential gearing 4. The differential gearing is connected to a rear axle arranged in an axle housing 5 and carrying rear wheels 6. The vehicle is further provided with the usual front wheels 7, and a driver's seat 8 is arranged on the vehicle between the front and rear wheels.

The device forming the subject matter of the present invention consists of a drum or roll 9 mounted in suitable bearings in cross beams 10, forming a portion of the body of the vehicle. A chain 11 is connected to this drum and is adapted to be wound and unwound by the power of the engine. As shown, the drum is provided with stub shafts 12, arranged at each end and the forward stub shaft is adapted to receive a gear 13, which is keyed thereto in any suitable manner. The loading mechanism is provided with a main shaft 14, extending longitudinally of the vehicle and pinion 15 is mounted on this shaft. The pinion is capable of longitudinal movement to engage and disengage the gear 13, but is incapable of independent rotation on the shaft. As shown, the shaft is provided with a key 16, which is received in a groove in the pinion.

The main shaft 14 of the loading mechanism extends through plates 17 of the loading mechanism control and is journaled therein. The opposite end of the shaft is journaled in a bearing 18, carried by cross beam 10 of the motor vehicle frame or body. As shown, the plates 17 are connected to the body of the vehicle by means of angular plates 19, which are secured to the body of the vehicle by rivets 20 and similarly secured to the plates 17. These plates are further braced by angular plates 21, riveted to the frame of the vehicle, as at 22, and to the plates 17, as at 23. Suitable braces 24 may also be secured to the longitudinal beam 25 of the vehicle and the plates 21. The lower ends of the plates rest upon the step or running board 26.

A pulley 27 is mounted on the shaft 14, and is keyed thereto by a key 28. A drive shaft 29 is arranged below this pulley and this shaft passes through slots 30 in the walls or plates 17 and is received in bearings 31 carried by arms or links 32. This shaft is provided with a sleeve 33, having a leather facing 34. The sleeve is losely mounted on the shaft, the sleeve being adapted to revolve and the shaft remains stationary. One end of the sleeve is reduced, as at 35, and is provided with a sprocket wheel 36, keyed thereto as at 37. The sprocket wheel is adapted to receive a chain 38, which passes over a sprocket wheel 39, arranged on a stub shaft 40, projecting from the transmission casing 41, and adapted to be driven by the engine.

The position of the sleeve with respect to the pulley is controlled by a rod or shaft 42, which is journaled in the walls 17. The ends of this shaft are squared, as at 43, and are adapted to receive disks 44. Arms 32 are connected to the disks 44 by means of suitable pins 45, received in openings 46 formed in the disk. A suitable control lever 47 is arranged on the shaft 42 and as shown (see Figure 2), this lever is arranged adjacent the driver's seat of the vehicle.

The pinion 15 is adapted to be moved in and out of engagement with the gear 13 by means of a yoke 48, having an arm 49 arranged on each side of the pinion. This yoke is slidably mounted on a beam 50, secured to the longitudinal beam 25 of the frame of the vehicle. A control rod 51 is connected to the yoke to control its position and the opposite end of the control rod is connected to a pivoted lever 52, which is pivotally mounted in a bracket 53 on the side of the vehicle and is provided with a handle 54 arranged adjacent the driver's seat.

The chain assembly by means of which the logs are loaded is as follows:

A pair of chains 55 are secured to cross beams 10 of the vehicle at a point intermediate the sides of the vehicle. These chains are adapted to extend over the side of the vehicle and beneath the logs to be loaded. A chain 56 is connected to each of these chains, the chain 56 being provided with hooks 57 at each end to engage the links of the chains 55. By means of this construction, the chain 56 may be connected to the chains 55 at any desired point. The chain 11 is provided with a hook 58 and this chain is adapted to be extended over the logs to be loaded and connected to one of the links of the chain 56. Suitable skids 59' are arranged at the side of the vehicle and the logs are conveyed up these skids to load the vehicle. When the vehicle is loaded, the chains are left in position and they prevent the logs from being accidentally displaced on the left hand side of the vehicle. Suitable blocks 59 may be arranged on the opposite side to prevent displacement of the logs. As shown, these blocks are connected to links 60 which are pivotally connected to the cross beams to permit the blocks to be swung out of position to one side of the vehicle when desired.

The chains are retained in the desired position when the logs are loaded by means of a ratchet wheel 61, mounted on main shaft 14 of the loading mechanism. A pawl 62 is pivotally mounted in a bracket 63, arranged on one of the plates 17, and this pawl engages the ratchet wheel 61 to prevent the shaft 14 from revolving and the chains from unwinding. A chain 64 is connected to the pawl and extends to a point adjacent the top of the plate 17 to permit convenient manipulation of the pawl. As shown, the end of the chain is received in an eye 65.

In operation, the stub shaft 40 is driven by the engine, and is controlled in any suitable manner. Assuming that this shaft revolves in a clockwise direction, the sleeve 33 is driven in the same direction and the pulley 27 is driven in the same direction by means of a belt 66, which passes over the sleeve and pulley. To tighten the belt sufficiently to drive the pulley, it is necessary to lower the shaft 29 to the bottom of slots 30. This is accomplished by revolving the shaft 42 through the medium of control lever 47 and lowering the links 32 which are connected to disks 44, eccentrically of the center of the shaft 42. The pinion 15 is moved to the rear by means of pivoted lever 52 and meshes with gear 13. Revolution of the shaft 14 thus drives the drum 9 and winds the chain 11 upon the drum. With the chains 55 arranged under the logs and the chain 56 connected to the chains 55, the winding of chain 11 upon the drum pulls the chain 56 around the logs forming a V, as shown in Figure 2 of the drawings, and the logs are lifted or dragged up the skids 59'. The loading mechanism may be disengaged at any time by disengaging pinion 15 and gear 13, or by moving the shaft 29 upwardly to permit the belt 66 to run freely. When the chain 11 has been wound on the drum sufficiently to draw the logs on to the vehicle in the position shown in Figures 2 and 4 of the drawings, the loading mechanism is disconnected, and pawl 62 engaged with ratchet wheel 61 to prevent the chains from unwinding. The logs are thus held in position on the left by the chains and on the right by the blocks 59. When the vehicle is to be unloaded, the ratchet and pawl are disengaged to permit the drum to be revolved in a reverse direction. This is accomplished by raising the shaft 29 to its uppermost position in the slots 30, causing engagement between the pulley 27 and the leather face 34. This friction drive causes the pulley and the main shaft 14 of the loading mechanism to be driven in a reverse direction and thus drives the drum 9 in a reverse direction to loosen the chain. The drum may be driven for several revolutions, causing sufficient slack in the chains to permit them to be unfastened. The logs may then be rolled off the truck or unloaded in any other suitable manner.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. A log loading device for motor vehicles comprising a loading drum, a main shaft operatively connected thereto, a pulley arranged on said shaft, a movably mounted sleeve arranged adjacent said pulley, said sleeve being connected to the engine of the vehicle to drive it, a leather facing arranged on said sleeve, a belt passing over said pulley and said sleeve to drive said pulley in one direction, and control means to permit movement of said sleeve into frictional engagement with the periphery of said pulley to drive said pulley in a reverse direction.

2. A log loading device for motor vehicles comprising a loading drum, a main shaft operatively connected thereto, a pulley arranged on said shaft, a movable shaft arranged adjacent said pulley, a revolving sleeve loosely mounted on said shaft, said sleeve being provided with a facing of leather, a belt passing over said pulley and said sleeve to drive said pulley in one direction, arms secured to the ends of the shaft on which said sleeve is mounted, and means for moving said arms to bring said sleeve into engagement with the face of said pulley to revolve it in the opposite direction.

3. A log loading device constructed in accordance with claim 2 wherein the means for controlling said arms comprises a shaft, plates mounted on the ends of said shaft and adapted to revolve therewith, and means for connecting said arms to said plates eccentrically of said shaft.

4. A log loading device for motor vehicles comprising a loading drum, a main shaft operatively connected thereto, a pulley arranged on said shaft, a movable shaft arranged adjacent said pulley, a revolving sleeve loosely mounted on said movable shaft, a sprocket secured to said sleeve, a chain surrounding said sprocket and connected with the engine of the vehicle to be driven thereby, said sleeve being provided with a facing of leather, a belt passing over said pulley and said sleeve to drive said pulley in one direction, arms secured to the ends of the shaft upon which the sleeve is mounted, and means for moving said arms to bring said sleeve into engagement with the face of the pulley to revolve it in the opposite direction.

5. A log loading device for motor vehicles comprising a loading drum, a main shaft operatively connected thereto, a pulley arranged on said shaft, a pair of spaced bearing plates provided with a pair of oppositely arranged slots, said pulley being arranged between said plates, a movable shaft having its ends mounted in said slots, a revolving sleeve loosely mounted on said movable shaft, a sprocket secured to said sleeve, a chain surrounding said sprocket and connected with the engine of the vehicle to be driven thereby, said sleeve being provided with a facing of leather, a belt passing over said pulley and said sleeve, and means for simultaneously moving the ends of said movable shaft in said slots to engage said sleeve with said pulley or said belt.

6. A log loading device for motor vehicles comprising a loading drum, a main shaft operatively connected thereto, a pulley arranged on said shaft, a pair of spaced bearing plates provided with a pair of oppositely arranged slots, said pulley being arranged between said plates, a movable shaft having its ends mounted in said slots, a revolving sleeve loosely mounted on said movable shaft, a sprocket secured to said sleeve, a chain surrounding said sprocket and connected with the engine of the vehicle to be driven thereby, said sleeve being provided with a facing of leather, a belt passing over said pulley and said sleeve, a rock shaft, a pair of arms each having an end eccentrically connected to said rock shaft, and means for rocking said shaft to engage said sleeve with said pulley or said belt.

7. A log loading device for motor vehicles comprising a loading drum, a main shaft operatively connected thereto, a pulley arranged on said shaft, a pair of spaced bearing plates provided with a pair of oppositely arranged slots, said pulley being arranged between said plates, a movable shaft having its ends mounted in said slots, a revolving sleeve loosely mounted on said movable shaft, a sprocket secured to said sleeve, a chain surrounding said sprocket and connected with the engine of the vehicle to be driven thereby, said sleeve being provided with a facing of leather, a belt passing over said pulley and said sleeve, a rock shaft, a pair of arms each having an end eccentrically connected to said rock shaft, means for rocking said shaft to engage said sleeve with said pulley or said belt, and means for locking said pulley against movement in one direction.

In testimony whereof we affix our signatures in presence of two witnesses.

ORIAN V. BROWN.
FRANK T. BROWN.
ALBERT J. BROWN.

Witnesses:
 FRANK FISCHER,
 HERMAN J. WIBBEL.